April 18, 1961 F. J. H. SCHULZ 2,979,762
CATTLE SLAUGHTERING CHUTE UNIT
Filed May 11, 1959 3 Sheets-Sheet 1

INVENTOR.
Frank J.H. Schulz
BY
Webster & Webster
ATTYS.

April 18, 1961 F. J. H. SCHULZ 2,979,762
CATTLE SLAUGHTERING CHUTE UNIT
Filed May 11, 1959 3 Sheets-Sheet 2

INVENTOR.
Frank J.H. Schulz
BY
Webster & Webster
ATTYS.

April 18, 1961 F. J. H. SCHULZ 2,979,762
CATTLE SLAUGHTERING CHUTE UNIT
Filed May 11, 1959 3 Sheets-Sheet 3

INVENTOR.
Frank J. H. Schulz
BY
Webster & Webster
ATTYS.

United States Patent Office 2,979,762
Patented Apr. 18, 1961

2,979,762

CATTLE SLAUGHTERING CHUTE UNIT

Frank J. H. Schulz, Rte. 1, Box 1395, Elk Grove, Calif.

Filed May 11, 1959, Ser. No. 812,485

2 Claims. (Cl. 17—1)

This invention relates in general to an improvement in slaughterhouse equipment.

In particular the invention is directed to, and it is a major object to provide, a novel cattle slaughtering chute unit which includes an animal receiving chute mounted for movement between progressive or sequential positions, including a first position in which the chute extends longitudinally for entry of the animal; a second position in which the chute upstands, and the animal is upended with its head lowermost and exposed for beheading after bleeding; and a third position in which the chute is inclined so that the carcass slides out of the chute onto the slaughterhouse floor.

Another important object of the invention is to provide a cattle slaughtering chute unit, as in the preceding paragraph, wherein the chute is pivotally mounted and power actuated for swinging movement between its several positions.

An additional object of the invention is to counterbalance the chute in order to relieve the power actuating mechanism from undue strain or load upon swinging of the chute between and to said positions.

A further object of the invention is to provide a chute unit which is adapted for the accomplishment of fast, convenient, and effective slaughtering of an animal in the chute, and the delivery of the carcass from said chute onto the slaughterhouse floor without the need of manual effort, or the use of any separate hoist, conveyor, or the like.

Still another object of the invention is to provide a cattle slaughtering chute unit which is designed for ease and economy of manufacture, simplicity of installation, and long trouble-free service.

It is also an object of the invention to provide a practical, reliable, and durable cattle slaughtering chute unit, and one which will be exceedingly effective for the purpose for which it is designed.

These objects are accomplished by means of such structure and relative arrangement of parts as will fully appear by a perusal of the following specification and claims.

In the drawings:

Fig. 5 is a cross section on line 5—5 of Fig. 1.

Figure 1:
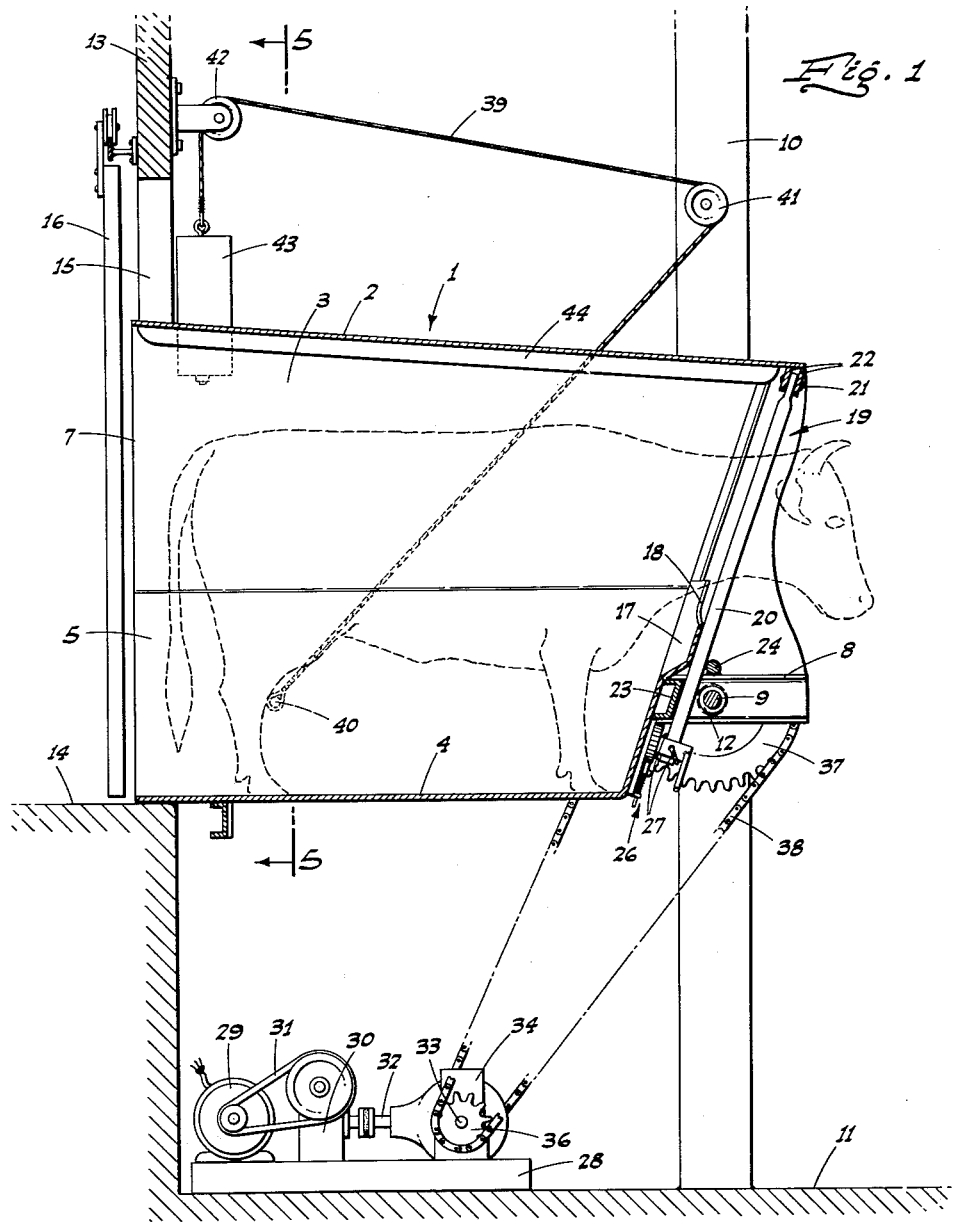
Fig. 1 is a side elevation of the cattle slaughtering chute unit, with the chute in its longitudinal position and in section.

Referring now more particularly to the drawings, and to the characters of reference marked thereon, with the parts described in their starting positions, the numeral 1 indicates generally an elongated, animal receiving chute.

The chute 1 includes a top 2, sides 3, and a bottom 4; said bottom 4 being connected to the sides 3 by downwardly convergent side extensions 5.

Longitudinal side beams 6 are included in the chute 1 adjacent but short of the bottom 4; such side beams lying outside of the downwardly convergent side extensions 5 but inside of the lower edge portions of the sides 3.

The chute 1 is open at its rear end, as at 7, while at the forward end of the chute the side beams 6 project a short distance ahead thereof, as at 8.

A fixed, transverse, horizontal shaft 9 spans between a pair of laterally spaced posts 10 which upstand from the slaughterhouse floor 11, with the forward part of the chute 1 disposed between such posts. The forwardly projecting end portions 8 of the side beams 6, are journaled on the shaft 9, as at 12, whereby the chute 1 is swingable about said shaft 9 as an axis.

The posts 10 upstand from the slaughterhouse floor 11 in spaced parallel relation to a wall 13 extending upwardly from a floor 14 disposed at a level higher than said slaughterhouse floor 11; the wall 13 having a door opening 15 therein, and which door opening 15 is adapted to be closed by a sliding door 16. With its forward end pivoted on the shaft 9, the chute 1—in its initial or longitudinal position—rests at the rear end on the floor 14 within the door opening 15; the open rear end 7 of the chute 1 being adapted to be closed by the sliding door 16.

At the forward end thereof the chute 1 is fitted, in the lower half, with a filler plate 17 having a central, upwardly opening notch or cradle 18 therein for the reception of the neck of an animal in the chute.

Ahead of the filler plate 17 the chute 1 is fitted with a stanchion, indicated generally at 19; such stanchion comprising a pair of transversely spaced stanchion bars 20 pivoted at their upper ends, as at 21, to a cross member 22 at the top of the chute; such stanchion bars 20 as so pivoted being laterally swingably adjustable.

Adjacent but short of their lower ends the stanchion bars 20 are engaged and guided between a transverse beam 23 abutting filler plate 17, and a cross rod 24 ahead thereof; both beam 23 and rod 24 spanning between the projecting end portions 8 of the side beams 6.

Tension springs 25 connect between the stanchion bars 20 and the sides 3 of the chute; such springs tending to swing said stanchion bars apart, but which motion is normally prevented as follows:

A small hand winch, indicated generally at 26, is mounted on the front of the filler plate 17 between the lower ends of the stanchion bars 20, and such winch includes oppositely wound cables 27 which lead outwardly to connection with the lower ends of said stanchion bars 20. By manipulation of the hand winch 26, which is of releasable ratchet-holding type, the spacing of the stanchion bars 20 can be effectively regulated.

The power actuating mechanism for the pivotally mounted or swingable chute 1 comprises the following:

A base 28 is secured to the slaughterhouse floor 11 directly below the chute 1, and such base supports a reversible electric motor 29 which drives a reduction gear box 30 by means of an endless belt and pulley unit 31. In turn the reduction gear box 30 actuates a short, longitudinal drive shaft 32 which imparts motion to a transverse shaft 33 through the medium of a direction-changing gear box 34 which includes lateral housings 35 for said transverse shaft 33.

At the opposite ends thereof, and beyond the housings 35 the transverse shaft 33 is fitted with relatively small, lower sprockets 36, while relatively larger upper sprockets 37 are journaled on transverse shaft 9 between the related posts 10 and the sides 3 of the chute; said upper sprockets 37 being fixed to said chute.

An endless chain 38 connects each lower sprocket 36 with the corresponding upper sprocket 37.

Figure 2:
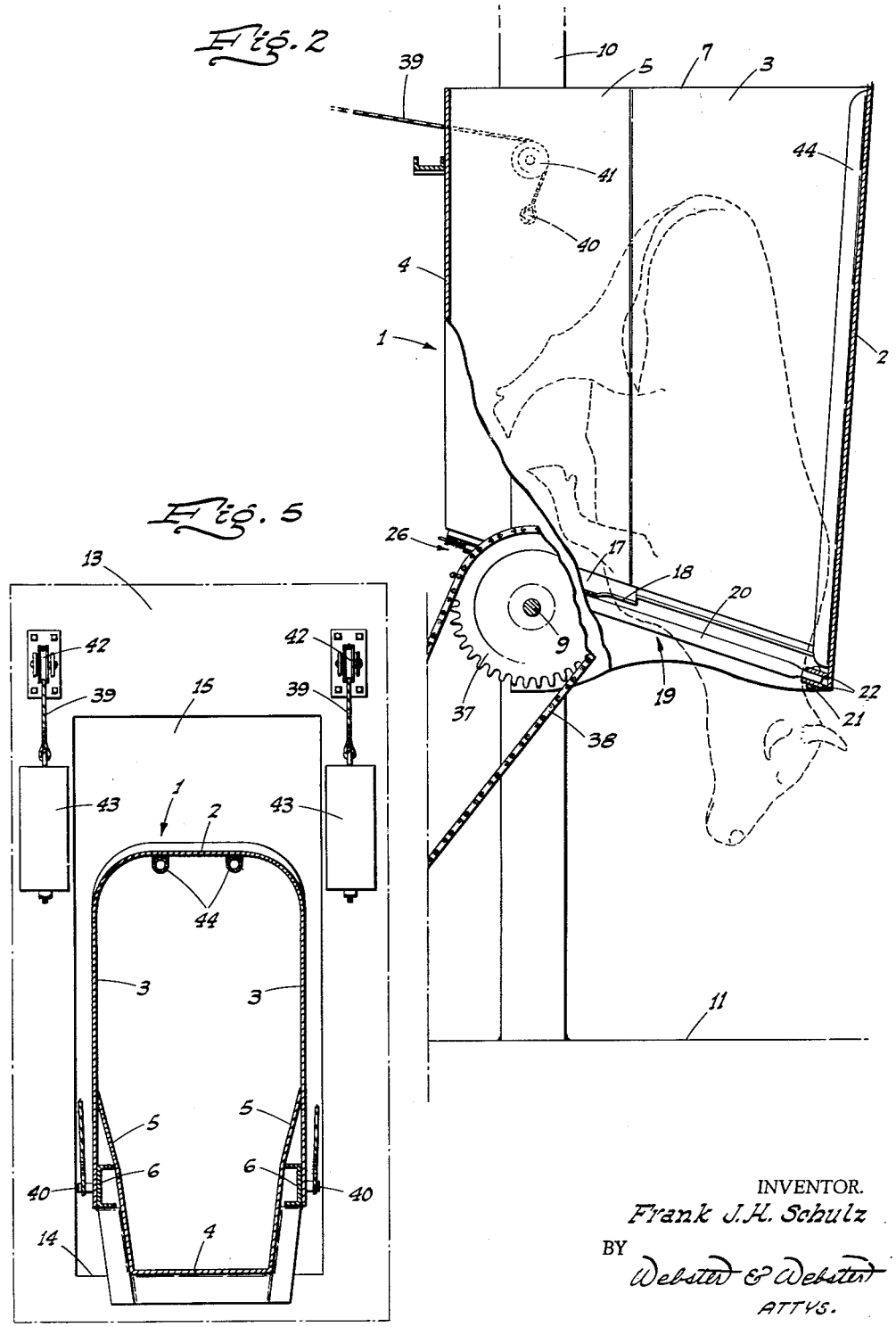
Fig. 2 is a similar but somewhat fragmentary view, partly broken away, with the chute in upstanding position.
Figure 3:
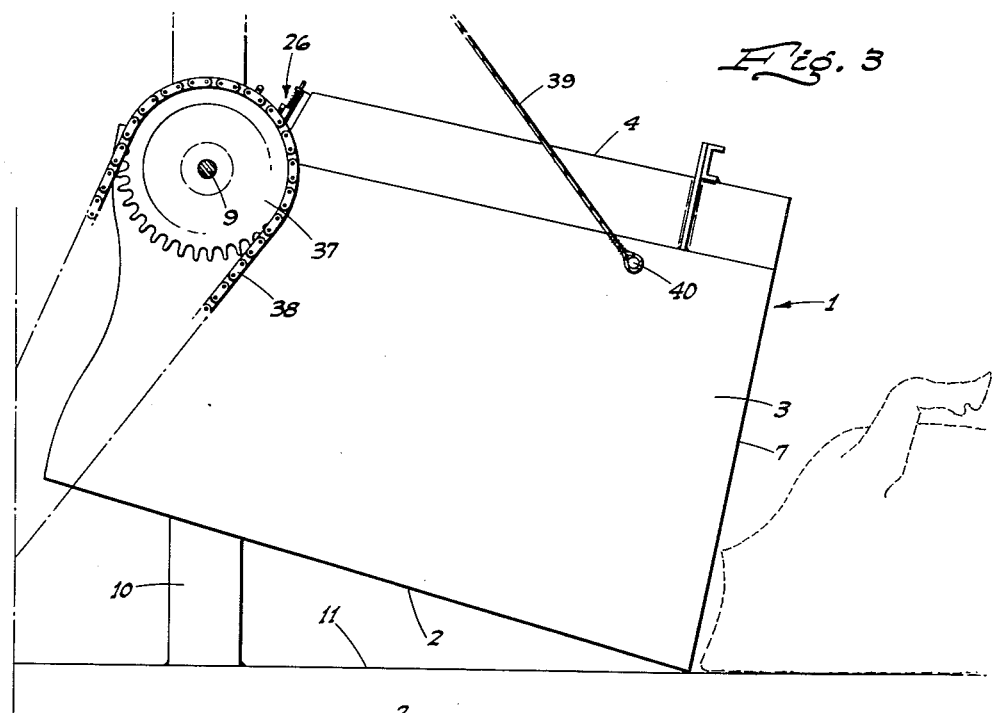
Fig. 3 is a side elevation of the chute in inclined position.
Figure 4:
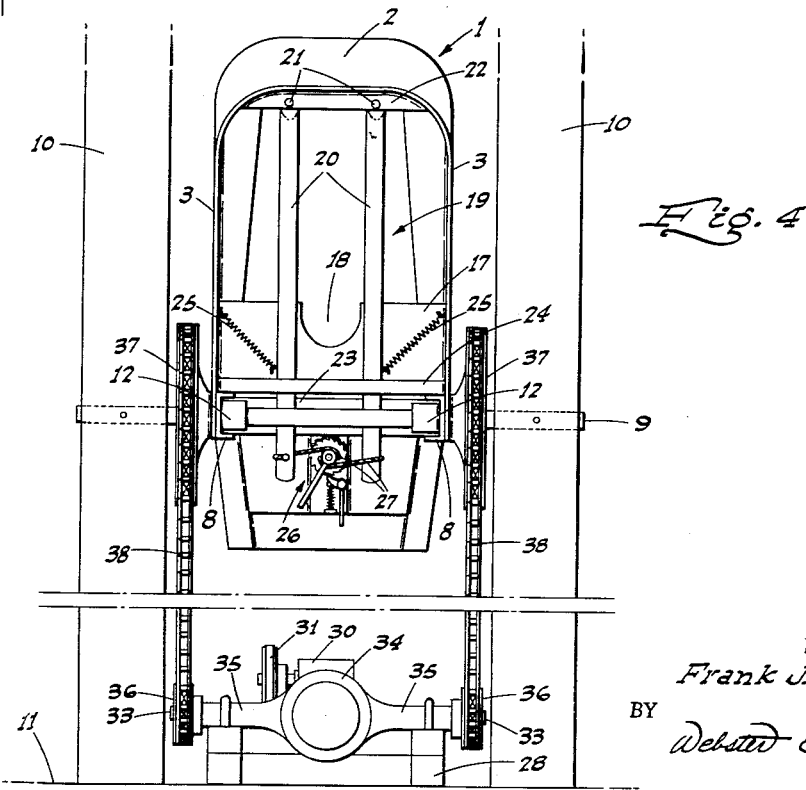
Fig. 4 is a front end elevation of the chute unit with the chute disposed as in Fig. 1.

Through the medium of the above described power actuating mechanism, the chute 1 can be forcefully and positively swung from its longitudinal position, as in Fig. 1, to an upstanding position, as in Fig. 2, and then to a forwardly and downwardly inclined position with the open end 7 resting on the slaughterhouse floor 11, as in Fig. 3. In such inclined position, the chute extends generally in opposition to and is inverted relative to the longitudinal position of Fig. 1.

The chute 1 is effectively counterbalanced—as it is so swung, and in order to relieve the load on the power actuating mechanism—by the following arrangement:

A cable 39 is anchored, as at 40, on each side 3 of the chute 1, and thence extends at a forward and upward incline to a pulley 41 on the corresponding post a considerable distance above the transverse shaft 9. After passing forwardly about the pulley 41 each cable 39 extends rearwardly to, and passes over, a pulley 42 on wall 13; the cable depending from such pulley 42 and carrying a counter-weight 43.

With the above counter-balancing arrangement the chute 1 can be swung between its several positions without the weight of such chute 1 imposing too great a load on the power actuating mechanism.

In use of the above described cattle slaughtering chute unit the door 16 is initially open and the chute 1 is disposed in its longitudinal position, as in Fig. 1; the animal being driven into said chute from the floor 14 and through the open rear end 7 of such chute.

Thereafter, the sliding door 16 is closed in order to retain the animal in the chute 1, and at which time the animal's neck is embraced by the stanchion 19, with the head of the animal ahead thereof.

The animal is then shot in the head, and immediately the chute 1 is swung to its upstanding position, as in Fig. 2; the animal's body resting downwardly against the stanchion 19 and with the animal's head depending therebelow.

Nextly, the animal is bled, and which is followed by beheading.

After beheading of the animal the chute 1 is swung from its upstanding position of Fig. 2 to its forwardly and downwardly inclined position, as in Fig. 3, and wherein the open end 7 of chute 1 then rests on the slaughterhouse floor 11. Upon the chute 1 being swung to such forwardly and downwardly inclined position, the carcass of the animal automatically slides out of said open end 7 of the chute and passes onto the slaughterhouse floor 11 for subsequent processing.

In order to aid in, or assure of sliding of, the carcass out of the forwardly and downwardly inclined chute when in the position of Fig. 3, a pair of transversely spaced, longitudinal slide bars 44 are fixed on the inner side of the top 2; such bars serving to minimize the frictional drag of the carcass as it slides out of the chute 1 onto the slaughterhouse floor 11.

After each slaughtering operation has been completed, the chute 1 is returned—by the power mechanism—to its initial or longitudinal position, as in Fig. 1; being then ready for the next slaughtering operation.

From the foregoing description it will be readily seen that there has been produced such a device as will substantially fulfill the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A cattle retaining device for a slaughterhouse comprising a chute having opposed top, bottom, and side walls and freely open at one end for the entry of an animal into the chute, a stanchion unit at the other end of the chute for embracing the neck of such animal in confining relation and so that the head of the animal projects ahead of the chute, means mounting the chute a predetermined distance above the floor of the slaughterhouse for controlled rotation about a transverse axis so that the chute may be turned in one direction from an initial substantially horizontal position with the bottom wall lowermost to a substantially inverted position with the top wall of the chute lowermost and disposed adjacent and at an upward slope to the floor from the open end of the chute, and means applied to the chute to thus rotate the chute and maintain the same in any rotated position.

2. A device, as in claim 1, in which said means comprises a sprocket wheel fixed with the chute concentric with the axis of rotation thereof, and a power unit mounted in the slaughterhouse to drive the sprocket.

References Cited in the file of this patent

UNITED STATES PATENTS

| | | |
|---|---|---|
| 651,499 | Byrd | June 12, 1900 |
| 1,438,814 | Eckery | Dec. 12, 1922 |
| 1,717,532 | Trees | June 18, 1929 |
| 1,980,679 | Graham | Nov. 13, 1934 |